United States Patent [19]

Kozlik

[11] Patent Number: 4,556,974
[45] Date of Patent: Dec. 3, 1985

[54] METHOD FOR PASSING A TOKEN IN A LOCAL-AREA NETWORK

[75] Inventor: Tony J. Kozlik, Phoenix, Ariz.

[73] Assignee: Honeywell Inc., Phoenix, Ariz.

[21] Appl. No.: 540,062

[22] Filed: Oct. 7, 1983

[51] Int. Cl.⁴ .............................................. H04J 3/16
[52] U.S. Cl. .................................................... 370/89
[58] Field of Search ........................ 370/85, 86, 87, 94

[56] References Cited

U.S. PATENT DOCUMENTS

| 4,445,116 | 4/1984 | Grow | 370/89 |
| 4,456,956 | 6/1984 | El-Golary et al. | 370/85 |
| 4,464,749 | 8/1984 | Vlug | 370/94 |

OTHER PUBLICATIONS

Computer Communications; "Survey of Computer Communications Loop Networks: Part 1; vol. 2, No. 4, Aug. 1979; Penney et al.; pp. 165-180.

Primary Examiner—Douglas W. Olms
Assistant Examiner—Frank M. Scutch, III
Attorney, Agent, or Firm—A. A. Sapelli; L. J. Marhoefer; E. W. Hughes

[57] ABSTRACT

The method by which the right of access to the common communication medium of an initialized local-area network is transferred between modules having access to the medium by the module having such access transmitting a token to a designated existing and properly functioning module. Each such module is assigned a unique address, its MY ADDRESS, and has the data-processing capabilities to determine and store the address of the module to which it last successfully transferred a token, its LAST SUCCESS ADDRESS. Each module also determines the address of a module, if any, between its LAST SUCCESS ADDRESS and its MY ADDRESS, its TRY ADDRESS. The module which has accepted a token will try to pass a token to the module whose address is that of its TRY ADDRESS if its TRY ADDRESS differs from its LAST SUCCESS ADDRESS before attempting to pass a token to the module whose address is that of its LAST SUCCESS ADDRESS. Each module calculates a different TRY ADDRESS if the difference between its MY ADDRESS and its LAST SUCCESS ADDRESS is greater than one each time it successfully passes a token to another module.

6 Claims, 6 Drawing Figures

METHOD FOR PASSING A TOKEN IN A LOCAL-AREA NETWORK

CROSS-REFERENCE TO RELATED APPLICATIONS

The following copending concurrently filed applications relate to the invention of the present application and are incorporated herein by reference:
A. "Plant Management System" by Russell A. Henzel, application Ser. No. 540,061, filed Oct. 7, 1983; and
B. "Method for Initializing a Token-Passing Local-Area Network" by Tony J. Kozlik, application Ser. No. 540,216, filed Oct. 7, 1983.

All the foregoing are assigned to the same assignee.

BACKGROUND OF THE INVENTION

1. Field of the Invention

This invention is in the field of token-passing local-area networks and more particularly relates to an improved method by which one module of such a network passes a token to another specified, or addressed, module, which token, when accepted by the addressed module, authorizes that module access to the medium of the network for the purpose of transmitting information over the medium.

2. Description of the Prior Art

In any local-area network where a single communication medium is shared by many modules, there must be an access control mechanism or procedure which provides each module with access to the medium for the purpose of transmitting information. Some systems allow collisions; i.e., several modules can transmit simultaneously and provide methods for resolving such unacceptable conditions so that only one module at a time has access to the medium for the purpose of transmitting data. Token-passing access control methods allow a module which has accepted a token from another module to have exclusive access to the medium to transmit information to other modules normally for a limited period of time, at the end of which period the module having the token must transfer a token to another successor module.

To do this, a special frame, a series or set of binary digits called a token pass frame, or a token, is transmitted from one module to another module around a logical ring based on the physical address assigned to each module. While a module has access to the medium, it is permitted to transmit information, an information frame, to one or more modules connected to the medium before passing a token to a success or module. An advantage of token-passing methods of controlling access to the medium of the network is the determinism of such methods. The number of modules comprising the logical ring of the network is known. From this information, it is possible under non-error conditions to calculate the maximum time it will take for a given module to receive a token addressed to it by a predecessor module, or, stated another way, the maximum time it takes to pass a token to each module of the ring, or to complete a ring cycle. With other access-control mechanisms, it is only possible to determine within a specified time period that there is a given probability that a given module will be given access to the medium for the purpose of transmitting information. This deterministic characteristic of a token-passing local-area network is important, particularly in the operation of process-control systems during process upset conditions.

A problem with token-passing methods of the prior art networks is that when additional modules are incorporated into the network or when modules are removed or become non-operative, some special action is required to cause the network to incorporate additional modules or to delete those removed or nonfunctioning with a minimum of undesired consequences to the network.

BRIEF SUMMARY OF THE INVENTION

The present invention provides an improved method by which the right of access for the purpose of transmitting information over a common communication medium of an initialized local-area network is transferred between a limited number of modules forming a logical ring, each module of which is in communication with the medium. A module having access to the medium can only transfer its right of access by transmitting a token addressed to a designated existing and properly functioning module and having that module accept the token. The successor module accepts a token addressed to it by transmitting data over the medium within a predetermined time interval, or interframe gap, after receiving such a token.

Each module of the network includes a bus interface unit (BIU) and each BIU is assigned a unique network address, the physical address of the module or of its BIU. In response to the receipt of a token addressed to a given module, that module, upon recognizing that a token is addressed to it, has access to the communication medium, a bus, over which the module having the token at any given time transmits an information frame in bit serial fashion to one or more modules and then a token addressed to another BIU or module in the network. Each BIU includes data processing means, a microengine, which includes a random-access memory in which each BIU stores its network address, hereafter sometimes called its MY ADDRESS, the network address of the BIU to which it passed a token the last time it had the token, or access to the medium, hereafter sometimes called its LAST SUCCESS ADDRESS, and for determining and storing the address of a BIU, if there is one, between its MY ADDRESS and its LAST SUCCESS ADDRESS, sometimes called its TRY ADDRESS, to which each module which has the token at any given period of time in turn will attempt to pass a token each time it has the token.

Each BIU of each module analyzes the data transmitted over the medium to see if the data it receives constitutes a token and, if the token is addressed to it. A module determines if a token is addressed to it by comparing the address portion, the destination address of the token, with its MY ADDRESS. A module that is not addressed by a given token continues to monitor; i.e., receive and analyze information transmitted over the medium until a token addressed to it is received. If a received token is addressed to an existing and properly functioning BIU, the addressed BIU transmits an information frame, if available, and then transmits a token addressed to a BIU whose address is that of its LAST SUCCESS ADDRESS if its LAST SUCCESS ADDRESS equals it MY ADDRESS plus one; i.e., it does not have a valid TRY ADDRESS. If its LAST SUCCESS ADDRESS does not equal its MY ADDRESS plus one, the BIU having the token will transmit a token addressed to a BIU, the address of which is that of the transmitting module's TRY ADDRESS. If a token is successfully passed to a BIU whose address is that of the transmitting module's TRY ADDRESS, the transmitting module will change its LAST SUCCESS ADDRESS to a new LAST SUCCESS ADDRESS which is the same as its TRY ADDRESS and will then generate a new TRY ADDRESS which is equal to its MY ADDRESS plus one and stores it as its new TRY ADDRESS in its memory. If an unsuccessful attempt to pass a token to a BIU whose address is that of the transmitting module's TRY ADDRESS is made, the TRY ADDRESS will be incremented by one to form a new TRY ADDRESS, which new TRY ADDRESS is stored in the transmitting module's memory as the transmitting module's TRY ADDRESS, which new TRY ADDRESS will be used the next time the module accepts a token. If its TRY ADDRESS equals its LAST SUCCESS ADDRESS, then a new TRY ADDRESS will be formed which equal the transmitting module's MY ADDRESS plus one and a token will be transmitted addressed to a module whose address is that of the transmitting module's LAST SUCCESS ADDRESS. If the token, the address portion of which is the transmitting module's LAST SUCCESS ADDRESS, is not accepted by the addressed BIU, then the module having the token will increment its LAST SUCCESS ADDRESS by one and transmit a token addressed to a module whose physical address is that of its LAST SUCCESS ADDRESS incremented by one. The module having the token will continue incrementing its LAST SUCCESS ADDRESS and transmitting a token until a token is accepted by an addressed BIU. The physical address of the module accepting the token addressed to it is the new LAST SUCCESS ADDRESS of the module that transmitted that token. However, the module having the token will terminate operation if the address of a token it is prepared to transmit equals its MY ADDRESS. If this happens, the module having the token is either alone in the network or has malfunctioned.

It is, therefore, the object of this invention to provide an improved method in a token-passing initialized local-area network in which a module may be added, deleted, or fail without requiring any special action to adjust the process by which tokens are passed between existing properly functioning modules.

BRIEF DESCRIPTION OF THE DRAWINGS

Other objects, features and advantages of the invention will be readily apparent from the following description of certain preferred embodiments thereof taken in conjunction with the accompanying drawings, although variations and modifications may be effected without departing from the spirit and scope of the novel concepts of the invention and in which.

DESCRIPTION OF THE INVENTION

Figure 1:
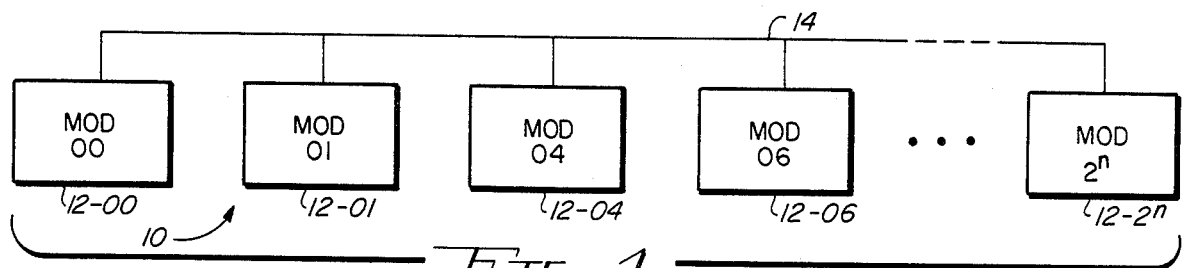
FIG. 1 is a schematic block diagram of a local-area network.
Figure 3:
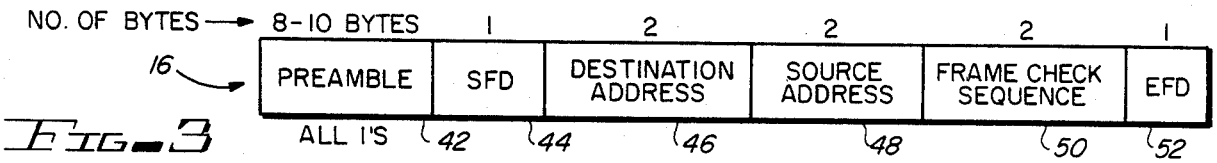
FIG. 3 illustrates the format of a token passing frame.
Figure 6:
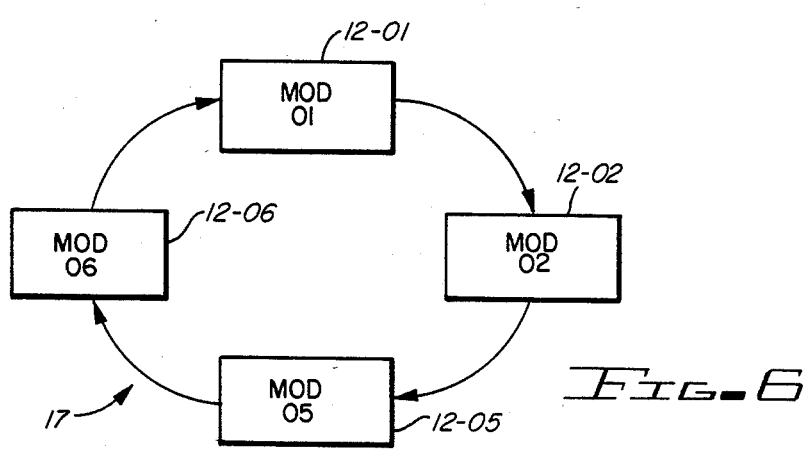
FIG. 6 illustrates a logical ring formed by the modules of a token passing local-area network.

The organization, or architecture, of local-area network 10 in which the method of this invention is practiced is illustrated in FIG. 1. Electronic modules 12-00 to 12-$2^n$, where n is an integer greater than one, communicate with each other over communication medium, or bus 14. In network 10, each of the modules 12 is the equivalent, or the peer, of the others. Thus, in network 10 no one of the modules 12 is a master module, and each of the modules 12 has an equal right of access for the purpose of transmitting information over bus 14. It should be noted that all modules 12 receive all signals transmitted over bus 14 by any of the other modules. Each module 12 is assigned a physical address with the smallest physical address of a module 12 being 00 and the largest being $2^n$. In the preferred embodiment, $n=7$, so that the maximum number of modules comprising network 10 is 128. While all the modules of network 10 are physically connected to bus 14 so as to both receive and transmit binary data, a logical ring is formed in which each module 12 transmits a token 16 to its successor, the next module 12 in the logical ring having a larger physical address. The format of a token frame 16 is illustrated in FIG. 3. A schematic diagram of logical ring 17 is illustrated in FIG. 6.

A successor module 12 recognizes that it is the successor, or accepts a token addressed to it by its predecessor module by transmitting within a predetermined period of time after receiving a token addressed to it, and by doing so has the token or accepts it. Accepting a token addressed to it confers on the accepting module 12, the right transmit information over bus 14 to other modules 12. Accepting a token requires the accepting module 12 to which the token is addressed to recognize the signals constituting a token as being such, and that the token is addressed to it. The receipt of such a token by a successor module 12 from its predecessor transfers the right to the successor to transmit within a predetermined period of time an information frame over bus 14 to any or all of the modules 12 connected thereto, as well as the necessity for transmitting a token 16 to its successor. As stated above, a successor module 12 is the module in ring 17 having the next larger physical address than the module having the token at any given time. In any such logical ring, the next larger address after $2^7$ or 127 is defined as being logical address 00. It should be noted that, while the maximum number of modules in a logical ring 17 is 128, the minimum number is 2. Each of the modules 12 has a given function, in the preferred embodiment, such as being an operator station, a mass-memory storage subsystem, a data processing subsystem, or an access controller which permits other devices including other local-area networks to communicate with network 10, etc.

Figure 2:
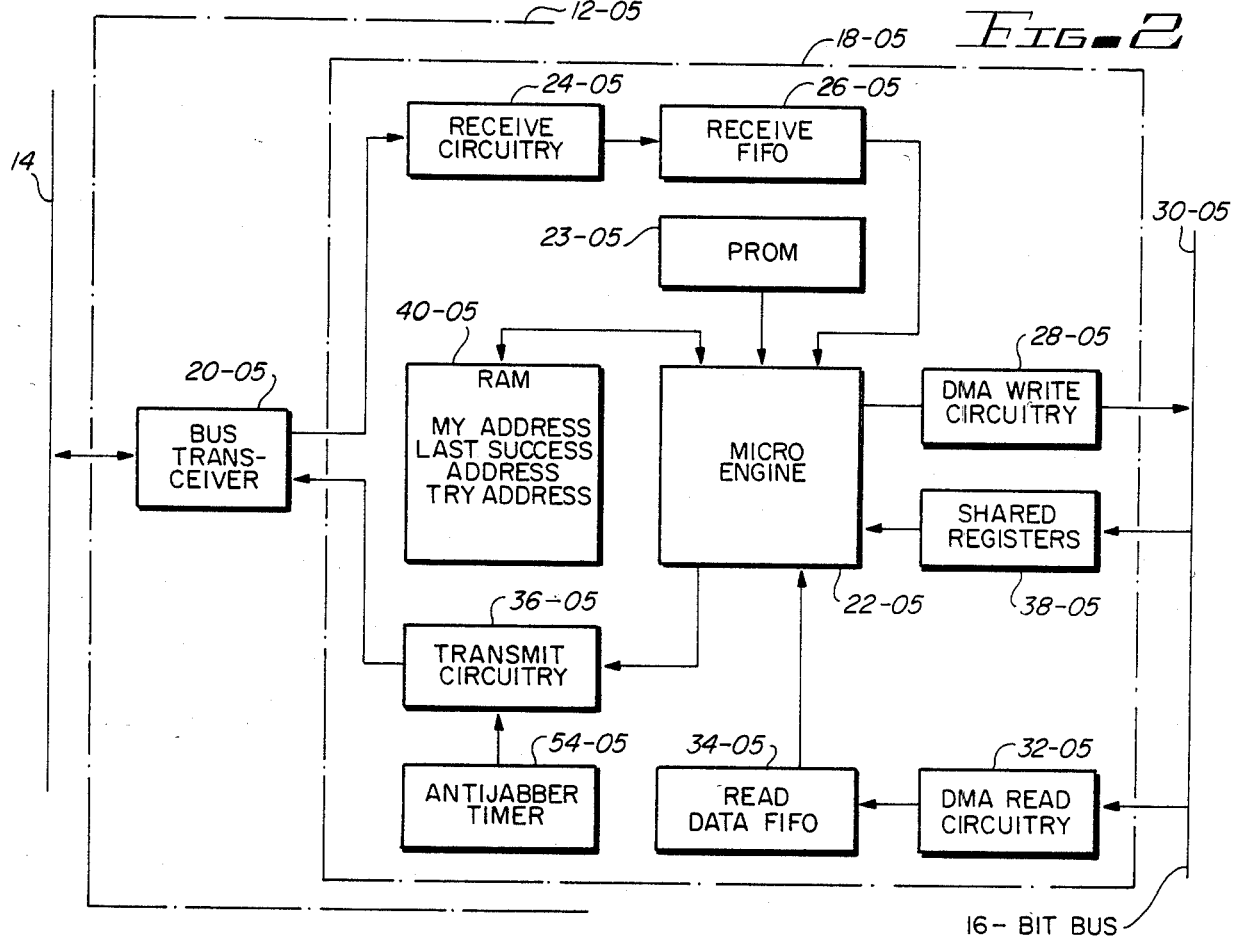
FIG. 2 is a block diagram of a bus interface unit of a module.

Each module 12, such as module 12-05 illustrated in FIG. 2, includes a bus interface unit (BIU) 18-05 and a transceiver 20-05 which connects BIU 18-05 to bus 14 and is capable of transmitting data over bus 14 and of receiving data from bus 14. Transceiver 20-05, in the preferred embodiment, is transformer coupled to bus 14, and, in the preferred embodiment, bus 14 is a coaxial cable having the capability of transmitting data at a b 5-megabit/second rate. BIU 18-05 is provided with a very fast microengine 22-05, one of the functions of which is to identify tokens 16 addressed to it or its module 12-05 and to transmit a token 16 to its successor, module 12-06, in logical ring 17 illustrated in FIG. 6.

Logical ring 17 consists of all of the properly functioning modules 12 connected to bus 14. In the preferred embodiment, microengine 22-05 is an 8-bit-wide arithmetic and logic unit made of bit slice components. Microengine 22-05 can execute a 24bit microinstruction from its programmable read only memory (PROM) 23-05 in 200 nanoseconds. Microengine 22-05 also includes a crystal controlled clock which produces 5 megahertz (MHz) clock signals.

Data received from bus 14 by BIU 18-05, for example, is transmitted by bus transceiver 20-05 and receive circuitry 24-05 to receive FIFO register 26-05, which, in the preferred embodiment, stores thirty-two eight-bit bytes of data plus one parity bit per byte. Microengine 22-05 examines the destination address fields of data information frames and token pass frames 16 received and stored in FIFO register 26-05 to determine if each frame received is addressed to it, and, if the frame addressed to it is an information frame or a token frame 16. If the received data is an information frame, then the received data is transferred by direct memory access (DMA) write circuitry 28-05 by conventional direct memory access techniques to a memory subsystem of module 12-05's CPU over module bus 30-05 over which the memory subsystem and module CPU directly communicate with BIU 18-05. Bus 30-05, in the preferred embodiment, is capable of transmitting sixteen data bits plus two parity bits in parallel. Module 12-05's CPU and memory subsystem are not illustrated since they are conventional.

If a received frame is a token pass frame 16 addressed to BIU; i.e., the token's destination address field 46 contains BIU 18-05's MY ADDRESS, microengine 22-05 is programmed to act without intervention of module 12-05's CPU. On receipt of a token pass frame 16, the destination address field 46 of the token, which is the physical address of module 12-05 and thus of BIU 18-05, BIU 18-05 will transmit an information frame, if one is available, to another module or to all of the modules 12 of logic ring 17. In doing so, microengine 22-05 causes its DMA read circuitry 32-05 to transfer data comprising this information from the memory subsystem of module 12-05's CPU into its read data FIFO register 34-05. Microengine 22-05 causes data from register 34-05 to be transferred to transmit circuitry 36-05 eight bits at a time once every eight instruction cycles, or clock periods, of microengine 22-05. The rate at which data is either obtained from or written into the memory subsystem of the module 12-05's CPU over module bus 30-05 by the DMA circuitry 28-05 or 32-05 is up to sixteen times greater than the rate at which the data is received from bus 14 by buffer receive register 26-05 or is transmitted by transmitter circuitry 36-05 and bus transceiver 20-05 to bus 14. To assure this is the case, each BIU 18 is assigned the highest priority with respect to direct memory access of the memory subsystem of its module 12's CPU.

Module 12-05's CPU issues commands to BIU 18-05 by writing the commands into shared registers 38-05. Microengine 22-05 processes such commands during interframe gaps or when a frame is being received that is not addressed to it. Shared registers 38-05 also contain status information that is readable by module 12-05's CPU. BIU 18-05 is also provided with a random-access memory 40-05, into which is stored the physical address of module 18-05 in the network ring 17, its MY ADDRESS. The source of the signals representing module 18-05's physical address in the preferred embodiment is a series of interconnections on the same circuit board as transceiver 20-05.

The format of token pass frame 16 is illustrated in FIG. 3. Token 16 consists of a preamble 42, which is a series of logical ones, from 8 to 10 bytes worth. Preamble 42 is followed by a start-of-frame delimiter (SFD) 44, consisting of one byte of data. SFD 44 is followed by destination address field 46, two bytes of data which includes the physical address of the module to which token 17 is addressed, the lower order seven bits of field 46 in the preferred embodiment, which field, in turn, is followed by a source address field 48 of 2 bytes. Field 48 includes the physical address of the module 12 transmitting token 17, the transmitting module, or the module having the token. The source address field 48 is followed by a 2-byte frame check sequence 50, an error detection code. The last byte 52 of token 16 is end-of-frame delimiter (EFD) 52.

Figure 4:
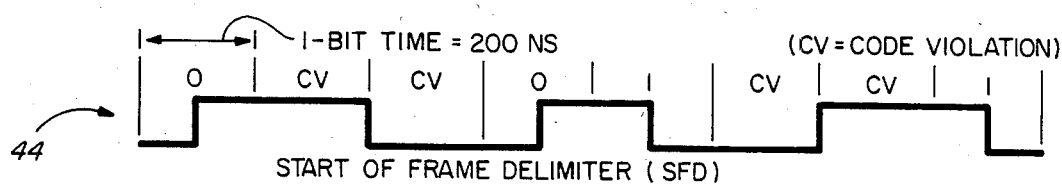
FIG. 4 illustrates the wave forms for a start-of-frame delimiter and an end-of-frame delimiter.
Figure 4:
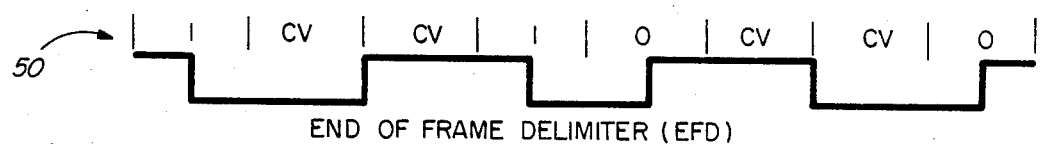

Wave forms of start-of-frame delimiter, SFD, 44 and of end-of-frame delimiter, EFD, 55 are illustrated in FIG. 4. Information transmitted by transmit circuitry 36 of the BIU 18 of the module 12 having the token over bus 14 consists of binary signals which are Manchester encoded so that a receive clock can be derived from the received signals by each receiving BIU 18. A logical 0 is transmitted by the signal during the first half of a bit being low and being high during the second half of the bit, a mid-bit low-to-high transition. A logical 1 is transmitted by the signal during the first half of the bit being high and low during the second half, a mid-bit high-to-low transition. Manchester encoding requires that there always be a transition in the middle of each bit cell. If there is no such transition, a code violation (CV) occurs. Both start and end-of-frame delimiters 44, 50 include code violations, four CV's for each. By using CV's in this manner, a 4-bit error would have to occur to change valid data into a frame delimiter. End-of-frame delimiter 50 is used rather than silence on bus 14 because of the possibility of reflections on bus 14 being interposed as a transmission after transmission is stopped by the module 12 having the token at any given time.

When commanded to perform a token ring initialization by module 18-05's CPU, for example, BIU 18-05, if it senses silence on medium 14 for a predetermined period of time, approximately 25.6 microseconds, will transmit a series of logical ones, for a period of time which is inversely proportional to its physical address. After transmitting such a series of 1's, if it senses that no signals are being transmitted on bus 14, BIU 18-05 will transmit a token 16 addressed to a module 12 with the next higher physical address BIU 18-05's, MY ADDRESS plus one. Thus, on the simultaneous or near simultaneous issuances of ring initializing commands by the CPU's of several modules 12, the module 12 with the lowest physical address in ring 17 will transmit for a longer period and thus become the ring initiator. The modules 12 with larger physical addresses will drop out of contention since the module 12 with the lowest physical address continues to transmit logical one signals for a longer period of time. Thus, the module 12 with the lowest physical address in ring 17 when ring 17 is initialized will be the ring initiator and will send a token pass frame 16 addressed to a module with the next higher address than its own; namely, the initiator module's MY ADDRESS plus 1. If a token transmitted by initiator module 12 is not accepted, then there is no properly functioning module 12 in ring 17 having such an address. If this happens, the initiator module 12 increments the destination address field 46 of a token 16 by one, which, in this example, would be its MY ADDRESS plus 2, and transmits a token 16, the destination address field of which is its MY ADDRESS plus 2. This step is repeated until a token 16 is accepted by a module 12, the physical address of which is the same as the destination address of the transmitted token 16. A module accepts a token 16 addressed to it by transmitting an information frame and/or a token frame 16 or both to its successor module by beginning transmission of such data within a predetermined time period, approximately 3 to 9 microseconds after it receives a token addressed to it. Additional details of the initialization process are set forth in a related application entitled "Method of Initializing a Local-Area Network", which is identified in the section of this application entitled "Cross-Reference to Related Applications".

If the module 12 with the next higher physical address is present, the module 12 to which token 16 is addressed will send an information frame if available and will attempt to pass a token 16, by transmitting a token 16 addressed to the module 12 with the next higher physical address. The module with the highest physical address in loop 16 will attempt to pass a token 16 to every address between its physical address and the highest possible address in ring 17, which is $2^n$ or 127. Thus, module $12\text{-}2^n$ will then attempt to pass a token 16 to a module 12 with address 00 and subsequently to modules 12, the addresses of which it increments by 1 after each failed attempt to pass a token until it is successful. After a module 12 is successful in passing a token 16 to a successor module 12, it remembers the physical address of the module to which it successfully passed a token 16 and stores this address in its random-access memory as its LAST SUCCESS ADDRESS. The next time that module receives a token addressed to it, it will try one intervening address between its MY ADDRESS and its LAST SUCCESS ADDRESS, its TRY ADDRESS, if there are any, each time it accepts the token. Once a token 16 has passed completely around logical ring 17, or has completed a ring cycle, formed by all the properly operating modules 12 connected to bus 14, network 10 is completely initialized.

If a module discovers that it is alone in ring 17, it makes no additional attempts to pass a token 16 and generates an interrupt with status to indicate its status to its module's CPU. The cause of such a condition may be that the module is the only properly functioning module 12 in loop 17, it may be defective for some reason and cannot receive information from other modules 12, or it cannot transmit information properly. When at least two modules of loop 17 are functioning properly, a logical ring 17 will be formed as soon as a token has been accepted by each properly functioning module 12.

After initialization, each BIU 18 knows its MY ADDRESS and its LAST SUCCESS ADDRESS and has computed a TRY ADDRESS. When a BIU 18 receives a token pass frame 16 addressed to it; i.e., the destination address field in token frame 16 equals its MY ADDRESS, the contents of its RAM location MY ADDRESS, the addressed BIU 18 is enabled to send an information frame to other BIU's before it is required to pass a token 16 to another BIU. A module 12 which has a token 16 is permitted to transmit continuously for up to a maximum period of up to approximately 8-20 milliseconds before its anti-jabber timer 54 times out and terminates any further transmission. Timer 54 is reset each time a transmission of an information or a token pass frame terminates. If timer 54 times out, microengine 22 notifies the module's CPU of this condition by a status signal placed in shared registers 38. When it is time for a BIU 18 having the token to pass a token 16 to its successor, the BIU 18 having the token transmits a token pass frame 16 addressed to a module 12, the address of which is that stored as its LAST SUCCESS ADDRESS in its memory 40, but only if its LAST SUCCESS ADDRESS equals the contents of its RAM location MY ADDRESS plus one; otherwise, it transmits a token pass frame 16 addressed to a BIU 18 with the address, its TRY ADDRESS, contained in its RAM location which is also identified as TRY ADDRESS. An addressed module 12 accepts a token 16 by starting to transmit data over bus 14 within a specified time, an interframe gap of preferably 3 to 6 microseconds in the preferred embodiment. The BIU 18 that has passed a token to its successor is now available to do other things while waiting for the receipt of a token pass frame 16 addressed to it. If not transmissions are present on bus 14 within approximately 10 microseconds after a token is transmitted, the token has not been successfully passed. In the preferred embodiment, if the first attempt to pass a token to a module whose address is that of the transmitting module's LAST SUCCESS ADDRESS fails, a second attempt is made to pass a token to that module before a token is transmitted to another module.

If a transmitted token 16 using the TRY ADDRESS of the module is not accepted, the module 12 transmits a token 16 with the destination address field 46 being that of its LAST SUCCESS ADDRESS. If that token is not accepted after a second attempt to do so fails, the BIU having the token increments the contents of RAM location LAST SUCCESS ADDRESS by one, and a token pass frame 16 is transmitted only once using this incremented address in its destination address field 46. This process continues until a token 16 is either passed successfully to a successor module 12 or until the contents of RAM location LAST SUCCESS ADDRESS of memory 40 equals the contents of RAM location MY ADDRESS. When this occurs, the BIU 18 ceases trying to pass a token 16 to a successor and informs its module's CPU by a status signal via shared register 38 that it is alone network 10. When a token 16 is successfully passed to a successor module 12 under these circumstances, its RAM location TRY ADDRESS is loaded with the contents of RAM location MY ADDRESS plus one.

If a token pass frame 16 is transmitted in which the destination address field 46 is that of the transmitting BIU's TRY ADDRESS and the token is successfully passed, then the transmitting BIU's RAM location LAST SUCCESS ADDRESS is loaded with the contents of its RAM location TRY ADDRESS and the contents of its TRY ADDRESS is changed to the contents of its RAM location MY ADDRESS plus one. If the token was not successfully passed, then the contents of its RAM location TRY ADDRESS is incremented by one unless it then equals the contents of its LAST SUCCESS ADDRESS, in which case the contents of its TRY ADDRESS is set to the contents of its MY ADDRESS plus one. The token 16 is then transmitted addressed to the module 12 whose physical address is the transmitting module's RAM location LAST SUCCESS, as described above.

Figure 5:
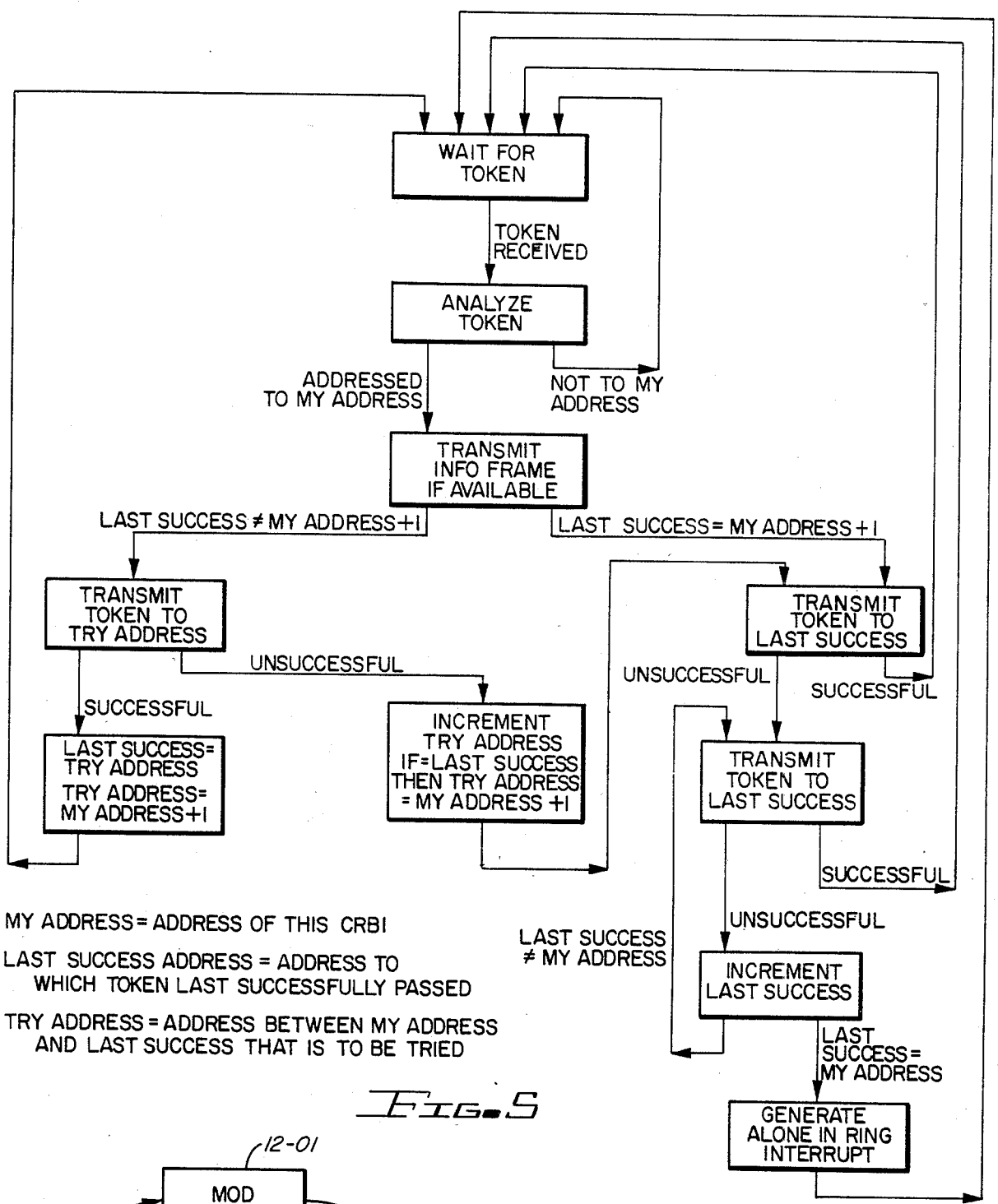
FIG. 5 is a flow diagram of the process of the invention.

It is the methodical transmission of token pass frames to the TRY ADDRESSES of the modules 12 of logic ring 17 between which there are gaps in the sequence of the physical addresses of the modules 12 forming ring 17 that gives this method its primary advantage. Newly powered up, or enabled, BIU's 28 connected to bus 14 will be included in ring 17 expeditiously because token pass frames 16 will be addressed to them so that they will be added to ring 17 after a few cycles of passing a token around ring 17. If a module 12 is physically removed from ring 17, is turned off, or becomes disabled, it will cease being its predecessor module's LAST SUCCESS ADDRESS after one cycle of operation of ring 17. The time required in transmitting token pass frames to non-existent modules is reduced by limiting to a reasonable maximum the maximum number of modules 12 connectable to bus 14 and by assigning physical addresses to the BIU's forming ring 17 in sequential order to the extent possible. In a network 10 in which the number of modules 12 forming ring 17 approaches ($2^n+1$), the percentage of time spent passing a token to non-existent or non-functioning modules is small as compared with the time available for transmitting information frames. FIG. 5 is a flow chart of the method described above.

What is claimed is:

1. The method by which in an initialized token-passing local-area network one module of a plurality of modules of the network which has the token offers the token to another module, comprising the steps of:

transmitting, upon receipt of a token including as a destination address its MY ADDRESS, information, if available, and a token including as a destination address the transmitting module's LAST SUCCESS ADDRESS if its LAST SUCCESS ADDRESS equals its MY ADDRESS plus one;

transmitting a token including, as a destination address, the transmitting module's TRY ADDRESS if its LAST SUCCESS ADDRESS does not equal its MY ADDRESS plus one;

storing the transmitting module's TRY ADDRESS as its LAST SUCCESS ADDRESS if the transmitted token including as the token's destination address the transmitting module's TRY ADDRESS is accepted by the module whose address is that of the transmitting module's TRY ADDRESS; and calculating and storing as the transmitting module's new TRY ADDRESS its MY ADDRESS plus one;

incrementing the transmitting module's TRY ADDRESS by one and storing this incremented address as its new TRY ADDRESS if the token transmitted including its TRY ADDRESS as the token's destination address, is not accepted;

determining if the incremented TRY ADDRESS equals the transmitting module's LAST SUCCESS ADDRESS; if it does, calculating a new TRY ADDRESS which equals its MY ADDRESS plus one, storing the new TRY ADDRESS and transmitting a token which includes as the token's destination address, the transmitting module's LAST SUCCESS ADDRESS;

incrementing by one the transmitting module's LAST SUCCESS ADDRESS if the transmitted token including as the token's destination address the transmitting module's LAST SUCCESS ADDRESS is not accepted and transmitting another token including as the token's destination address the transmitting module's incremented LAST SUCCESS ADDRESS;

repeating the previous step until a module accepts the token, the destination address of the token so accepted being the transmitting module's current LAST SUCCESS ADDRESS;

storing its current LAST SUCCESS ADDRESS; and terminating operation of the module if the module's current LAST SUCCESS ADDRESS equals its MY ADDRESS.

2. The method of claim 1 in which the module having the token and which having transmitted a token to its LAST SUCCESS ADDRESS which has not been accepted, transmits the same token a second time before transmitting a token, the destination address of which is that of a different module.

3. In an initialized local-area network having a plurality of electronic modules communicating with one another over a common bus, with each module being assigned a unique network address, and in which each module in response to the receipt of a token including its address, accepts the token by transmitting within a predetermined period of time information and/or a token including the address of another module, each module including means for retrievably storing its assigned network address, its MY ADDRESS, the network address of the module to which it most recently passed a token, its LAST SUCCESS ADDRESS, and for determining and storing the address of a module between its MY ADDRESS and its LAST SUCCESS ADDRESS, its TRY ADDRESS, to which each module which has accepted a token and while it has the token will incorporate in a token transmitted by it under certain conditions; the method by which a module accepts a token including its address, and transmits one or more tokens which includes the address of a module, comprising the steps of:

analyzing each token transmitted over the bus to determine if it includes a given module's MY ADDRESS;

transmitting upon receipt of a token including its MY ADDRESS information, if available, and a token including its LAST SUCCESS ADDRESS if its LAST SUCCESS ADDRESS equals its MY ADDRESS plus one;

if its LAST SUCCESS ADDRESS does not equal its MY ADDRESS plus one, transmitting a token including its TRY ADDRESS;

if the transmitted token is accepted by the module whose address is that of its TRY ADDRESS, storing as its LAST SUCCESS ADDRESS its TRY ADDRESS; and calculating and storing as its TRY ADDRESS its MY ADDRESS plus one;

incrementing its TRY ADDRESS by one and storing this incremented address as its TRY ADDRESS if the token transmitted, the address portion of which is its TRY ADDRESS, is not accepted;

calculating a new TRY ADDRESS which equals its MY ADDRESS plus one, storing the new TRY ADDRESS and transmitting a token which includes the address of a module, which is its LAST SUCCESS ADDRESS, if the incremented TRY ADDRESS equals its LAST SUCCESS ADDRESS;

incrementing by one its LAST SUCCESS ADDRESS if the module whose address is that of the address portion of the transmitted token does not accept the token and transmitting a token including the incremented LAST SUCCESS ADDRESS;

repeating the previous step until a module accepts the token, the address portion of the token so accepted being the module's latest LAST SUCCESS ADDRESS;

storing its latest LAST SUCCESS ADDRESS; and terminating operation of the module if its LAST SUCCESS ADDRESS equals its MY ADDRESS.

4. The method of claim 3 in which a module that accepts a token transmits a token addressed to its LAST SUCCESS ADDRESS which has not been accepted the first time it is transmitted, and transmits the same token a second time before transmitting a token, the address portion of which is changed to that of another module.

5. In an initialized local-area network having a plurality of electronic modules communicating withone another over a common bus, with each module including a bus interface unit (BIU) which is in communication with the bus, each BIU of each module in the network being assigned a unique network address and in response to the receipt of a token addressed to it, having access to the bus to transmit an information frame and a token addressed to another BIU in the network, with each BIU including computer means and random access memory means for storing each BIU's assigned network address, its (MY ADDRESS), the network address of the BIU to which each BIU passed the token the last time it had the token, its (LAST SUCCESS ADDRESS), and for determining and storing the address of a BIU between its MY ADDRESS and its LAST SUCCESS ADDRESS, its TRY ADDRESS, to which each BIU having the token will attempt to pass the token under certain conditions; the method by which a BIU accepts the token, passes the token to another BIU, comprising the steps of:

analyzing each token transmitted over the bus to determine if it is addressed to a given BIU's MY ADDRESS;

if not so addressed, then waiting for a token which is so addressed;

if addressed to a given BIU, said addressed BIU transmitting an information frame, if available, and then transmitting the token to the address of a BIU whose address is that of its LAST SUCCESS ADDRESS if its LAST SUCCESS ADDRESS equals its MY ADDRESS plus one;

if its LAST SUCCESS ADDRESS does not equal its MY ADDRESS plus one, transmitting the token to a BIU whose address is that of its TRY ADDRESS;

if the token is successfully passed to the BIU whose address is that of its TRY ADDRESS, changing its LAST SUCCESS ADDRESS to its new LAST SUCCESS ADDRESS which equals its TRY ADDRESS;

storing its new LAST SUCCESS ADDRESS in its memory and calculating a new TRY ADDRESS which is equal to its MY ADDRESS plus one and storing its new TRY ADDRESS in its memory;

if the attempt to pass the token to a BIU whose address is its TRY ADDRESS is unsuccessful, incrementing the TRY ADDRESS by one to form a new TRY ADDRESS and storing the new TRY ADDRESS in its memory; if the new TRY ADDRESS equals its LAST SUCCESS ADDRESS, then forming another TRY ADDRESS which equals its MY ADDRESS plus one and storing said another TRY ADDRESS in its memory, and transmitting the token to the BIU whose address is that of its LAST SUCCESS ADDRESS;

if the token addressed to its LAST SUCCESS ADDRESS is not accepted by the addressed BIU, incrementing the LAST SUCCESS ADDRESS by one and transmitting the token to the incremented LAST SUCCESS ADDRESS, and repeating this step until the token is successfully passed to an addressed BIU, the address of which is its new LAST SUCCESS ADDRESS;

storing its new LAST SUCCESS ADDRESS; and terminating operation of the BIU if its LAST SUCCESS ADDRESS equals its MY ADDRESS.

6. The method of claim 3 in which each BIU having the token will retransmit the token addressed to its LAST SUCCESS ADDRESS which was not accepted by the addressed BIU the first time it was transmitted before transmitting a token addressed to another BIU.

* * * * *